(12) United States Patent
Kweon et al.

(10) Patent No.: US 7,655,358 B2
(45) Date of Patent: Feb. 2, 2010

(54) POSITIVE ACTIVE MATERIAL COMPOSITION FOR RECHARGEABLE LITHIUM BATTERY AND METHOD OF PREPARING POSITIVE ELECTRODE USING SAME

(75) Inventors: Ho-Jin Kweon, Cheonan-si (KR);
Geun-Bae Kim, Cheonan-si (KR);
Hyun-Suk Jeong, Cheonan-si (KR);
Dong-Gon Park, Seoul (KR); Ki-Ho Kim, Cheonan-si (KR)

(73) Assignee: Samsung SDI Co., Ltd. (KR)

( * ) Notice: Subject to any disclaimer, the term of this patent is extended or adjusted under 35 U.S.C. 154(b) by 91 days.

(21) Appl. No.: 11/510,301

(22) Filed: Aug. 25, 2006

(65) Prior Publication Data

US 2006/0292446 A1 Dec. 28, 2006

Related U.S. Application Data

(62) Division of application No. 09/579,576, filed on May 25, 2000.

(30) Foreign Application Priority Data

| May 25, 1999 | (KR) | ................................ 99-18802 |
| May 25, 1999 | (KR) | ................................ 99-18803 |
| Aug. 19, 1999 | (KR) | ................................ 99-34414 |
| Oct. 1, 1999 | (KR) | ................................ 99-42394 |

(51) Int. Cl.
*H01M 4/58* (2006.01)

(52) U.S. Cl. .............................. 429/231.95; 429/218.1

(58) Field of Classification Search ............ 429/231.95, 429/218.1, 231.8, 223, 224, 231.4, 231.5, 429/231.6, 231.1

See application file for complete search history.

(56) References Cited

U.S. PATENT DOCUMENTS 5,641,591 A 6/1997 Kawakami et al.

(Continued)

FOREIGN PATENT DOCUMENTS

JP 7-153495 6/1995

(Continued)

*Primary Examiner*—Patrick Ryan
*Assistant Examiner*—Monique Wills
(74) *Attorney, Agent, or Firm*—Blakely, Sokoloff, Taylor & Zafman

(57) ABSTRACT

A positive active material composition for a rechargeable battery includes a positive active material selected from compounds represented by formulas 1 to 13, and at least one semi-metal, metal or oxides thereof:

$$Li_xMnA_2 \quad (1)$$

$$Li_xMnO_{2-z}A_z \quad (2)$$

$$Li_xMn_{1-y}M'_yA_2 \quad (3)$$

$$Li_xMn_2A_4 \quad (4)$$

$$Li_xMn_2O_{4-z}A_z \quad (5)$$

$$Li_xMn_{2-y}M'_yA_4 \quad (6)$$

$$Li_xBA_2 \quad (7)$$

$$Li_xBO_{2-z}A_z \quad (8)$$

$$Li_xB_{1-y}M''_yA_2 \quad (9)$$

$$Li_xB_{1-y}M''_yO_{2-z}A_z \quad (10)$$

$$Li_xNiCoO_{2-z}A_z \quad (11)$$

$$Li_xNiCoO_{2-z}A_z \quad (12)$$

$$Li_xNi_{1-y-z}Co_yM''_zA_2 \quad (13)$$

where $1.0 \leq x \leq 1.1$, $0.01 \leq y \leq 0.1$, $0.01 \leq z \leq 0.5$, M' is at least one transition metal or lanthanide metal selected from Al, Cr, Co, Mg, La, Ce, Sr, or V, M" is at least one transition metal or lanthanide metal selected from Al, Cr, Mn, Fe, Mg, La, Ce, Sr or V, A is selected from 0, F, S or P, and B is Ni or Co.

14 Claims, 9 Drawing Sheets

U.S. PATENT DOCUMENTS

| | | | |
|---|---|---|---|
| 5,744,266 A | | 4/1998 | Nunome et al. |
| 5,851,696 A | * | 12/1998 | Saidi et al. ............... 429/231.2 |
| 5,869,208 A | | 2/1999 | Miyasaka |
| 5,922,491 A | * | 7/1999 | Ikawa et al. ............... 358/1.15 |
| 6,040,090 A | | 3/2000 | Sunagawa et al. |
| 6,146,790 A | | 11/2000 | Omaru et al. |
| 6,153,338 A | | 11/2000 | Gan et al. |
| 6,348,182 B1 | | 2/2002 | Lu et al. |
| 6,379,842 B1 | | 4/2002 | Mayer |
| 6,589,694 B1 | * | 7/2003 | Gosho et al. ............. 429/231.1 |
| 7,101,642 B2 | | 9/2006 | Tsukamoto et al. |
| 2001/0010807 A1 | | 8/2001 | Matsubara |

FOREIGN PATENT DOCUMENTS

| | | |
|---|---|---|
| JP | 7-153496 | 6/1995 |
| JP | 8-138725 | 5/1996 |
| JP | 09-219199 | 8/1997 |
| JP | 10-255842 | 9/1998 |
| JP | 10-288495 | 10/1998 |
| JP | 1998-288495 | * 10/1998 |

* cited by examiner

POSITIVE ACTIVE MATERIAL COMPOSITION FOR RECHARGEABLE LITHIUM BATTERY AND METHOD OF PREPARING POSITIVE ELECTRODE USING SAME

The present patent application is a Divisional of application Ser. No. 09/579,576 filed May 25, 2000, entitled POSITIVE ACTIVE MATERIAL COMPOSITION FOR RECHARGEABLE LITHIUM BATTERY AND METHOD OF PREPARING POSITIVE ELECTRODE USING SAME, which claims priority from Korean Patent Application No. 99-18802, filed on May 25, 2000, Korean Patent Application No. 99-18803 filed on May 25, 2000, Korean Patent Application 99-34414 filed on Aug. 19, 1999 and Korean Patent Application No. 99-42394 filed on Oct. 1, 1999.

CROSS REFERENCE TO RELATED APPLICATION

This application is based on applications Nos. 99-18802, 99-18803, 99-34414, and 99-42394 respectively filed in the Korean Industrial Property Office on May 25, 1999, May 25, 1999, Aug. 19, 1999, and Oct. 1, 1999, the content of which are incorporated hereinto by reference.

BACKGROUND OF THE INVENTION

1. Field of the Invention

The present invention relates to a positive active material composition for a rechargeable lithium battery and a method of preparing a positive electrode using the same and, more particularly, to a positive active material composition for a rechargeable lithium battery exhibiting long cycle life characteristics.

2. Description of the Related Art

Rechargeable lithium batteries employ materials into or from which lithium ions are intercalated or deintercalated as negative and positive active materials.

Metallic lithium has been used as the negative active material in rechargeable lithium batteries. However, lithium metal has good reactivity toward electrolyte and deposits to form a dendric layer which induces short circuits between the negative and positive active material. There are at least two disadvantageous effects that arise from the reaction of lithium with electrolyte. One is the exothermic liberation of heat and the other is the formation of passive films on lithium, which has been shown to be one of the reasons for the loss of capacity of lithium cells upon repeated cycling.

The problem of lithium reactivity toward the electrolyte is addressed by replacing lithium metal with carbon-based materials. With the use of carbon-based active materials, the potential safety problem present in metallic lithium-based batteries can be prevented while achieving a relatively higher energy density as well as a reasonable shelf life.

For the positive active material in the rechargeable lithium battery, chalcogenide compounds into or from which lithium ions are inserted or extracted are used. Typical examples of the positive active material include $LiCoO_2$, $LiMn_2O_4$, $LiNiO_2$, $LiNi_{1-x}Co_xO_2(0<X<1)$ or $LiMnO_2$. $LiCoO_2$ is widely used as it has an electrical conductivity of about $10^{-2}$ to 1 S/cm at room temperature and high battery voltage, but has poor safety characteristics during high rate charges and discharges. $LiNiO_2$ has a high charge capacity, but is difficult to produce. Manganese-based material such as $LiMn_2O_4$ or $LiMnO_2$, etc. is easiest to prepare, is less expensive than the other materials, and has environmentally friendly characteristics. Such manganese-based compounds have low capacities, but $LiMn_2O_4$ is particularly stable for the battery use and thus attractive for electric vehicle application.

However, when a battery using manganese-based materials such as $LiMn_2O_4$ is charged and discharged for a long time, particularly, at a high temperature, a side reaction between the electrolyte and the manganese-based material occurs at the surface of the manganese-based material. It is believed that $H_2O$ reacts with $LiPF_6$ in the electrolyte to generate strong acid such as hydrogen fluoride (HF) which attacks the Mn present on the surface of the manganese-based active material and the attacked Mn is eluted into the electrolyte. The eluted Mn is dissolved in the electrolyte and the active material disintegrates. This side reaction seriously deteriorates the cycle life characteristics of the battery.

An attempt to solve this problem has been made by synthesizing a material including 1 or more equivalent Li or by partially substituting oxygen with F in a spinel manganese-based material. However, these methods do not effectively improve the cycle life characteristics of the battery, particularly, at high temperatures.

Furthermore, such problem due to the reaction between the positive active material and the electrolyte may occur in manganese-based active material as well as in cobalt- and nickel-based active materials. Therefore, the studies to reduce the reaction between the positive active material and the electrolyte are attempted, but the satisfied effect is not obtained.

SUMMARY OF THE INVENTION

It is an object of the present invention to provide a positive active material composition for a rechargeable lithium battery exhibiting long cycle life characteristics.

It is another object to provide the positive active material composition for a rechargeable lithium battery exhibiting good high-temperature cycle life characteristics.

It is still another object to provide the positive active material composition for a rechargeable lithium battery exhibiting thermal stability.

It is yet still another object to provide a method of preparing a positive electrode using the same.

These and other objects may be achieved by the positive active material composition including a positive active material and an additive. The positive active material includes a lithiated transition metal compound and the additive is selected from semi-metals, metals or oxides thereof.

The positive active material is selected from lithiated transition metal compounds represented by formulas 1 to 13 below and the semi-metal is selected from Si, B, Ti, Ga, Ge, or Al and the metal is selected from Ca, Mg, Sr or Ba.

$$Li_xMnA_2 \tag{1}$$

$$Li_xMnO_{2-z}A_z \tag{2}$$

$$Li_xMn_{1-y}M'_yA_2 \tag{3}$$

$$Li_xMn_2A_4 \tag{4}$$

$$Li_xMn_2O_{4-z}A_z \tag{5}$$

$$Li_xMn_{2-y}M'_yA_4 \tag{6}$$

$$Li_xBA_2 \tag{7}$$

$$Li_xBO_{2-z}A_z \tag{8}$$

$$Li_xB_{1-y}M''_yA_2 \tag{9}$$

$$Li_xB_{1-y}M''_yO_{2-z}A_z \quad (10)$$

$$Li_xNiCoA_2 \quad (11)$$

$$Li_xNiCoO_{2-z}A_z \quad (12)$$

$$Li_xNi_{1-y-z}Co_yM''_zA_2 \quad (13)$$

(where $1.0 \leq x \leq 1.1$, $0.01 \leq y \leq 0.1$, $0.01 \leq z \leq 0.5$, M' is at least one transition metal or lanthanide metal selected from Al, Cr, Co, Mg, La, Ce, Sr, or V, M" is at least one transition metal or lanthanide metal selected from Al, Cr, Mn, Fe, Mg, La, Ce, Sr, or V, A is selected from O, F, S or P, and B is Ni or Co).

In order to achieve these objects and others, the present invention provides a method of preparing a positive electrode for a rechargeable lithium battery. In this method, a positive active material is mixed with an additive. The positive active material is selected from lithiated transition metal compounds, and the additive is semi-metals, metals or oxides thereof. The lithiated transition metal compounds are represented by formulas 1 to 13. The semi-metal is selected from Si, B, Ti, Ga, Ge, or Al, and the metal is selected from Ca, Mg, Sr or Ba. An organic solvent is added to the mixture to prepare a positive active material composition and the positive active material composition is applied on a current collector. Next, the current collector coated with the positive active material composition is dried.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying, wherein.

DETAILED DESCRIPTION OF THE INVENTION

Figure 1:
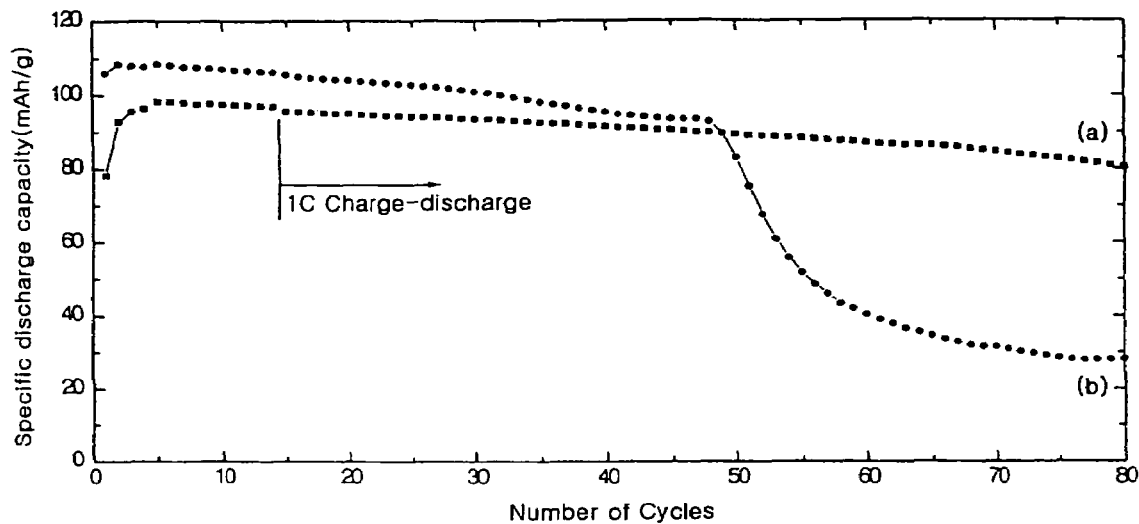
FIG. 1 is a graph illustrating high-temperature cycle life characteristics of rechargeable lithium batteries of Example 1 and Comparative Example 1.

A positive active material used in the present invention includes manganese-, cobalt- or nickel-based active material. Among these materials, the manganese active material such as $LiMn_2O_4$ has environmentally friendly characteristics and is less expensive than the other materials. Such manganese-based compounds are particularly stable for battery use and thus attractive for electric vehicle application. Further, cobalt-based active material such as $LiCoO_2$ has a good electrical conductivity and high battery voltage. Finally, nickel-based active material such as $LiNiO_2$ has a high charge capacity and is an economical material.

Useful manganese-based positive active materials are 3V grade-positive active material represented by the formulas 1 to 3 and 4V grade-positive active material represented by the formulas 4 to 6. Cobalt- or nickel-based positive active material includes cobalt- or nickel-based active material represented by the formulas 7 to 10, or cobalt-nickel-based active material represented by the formulas 11 to 13.

The positive active material composition of the present invention includes additives. The additives are semi-metals, metals or oxides thereof. The semi-metals, metals or oxides thereof improve discharge capacity and high C-rate cycle life characteristics, particularly, high C-rate and high temperature cycle life characteristics. Useful semi-metals or oxides thereof may be at least one Si, B, Ti, Ga Ge or Al, or oxides thereof. The exemplary of such semi-metal oxide is $SiO_2$. Useful metals or oxides thereof may be at least one Ca, Mg, Sr or Ba, or oxides thereof and the exemplary thereof may be CaO, MgO, SrO or BaO. The amount of the additives is 0.01 to 10 wt % of the positive active material. If the amount of the additives is less than 0.01 wt %, the effect of addition of the additives is not induced. Whereas, if the amount thereof is more than 10 wt %, the excess additives may act as impurities and adverse effects may be obtained.

The semi-metal, metals or oxides thereof of the present invention has good reactivity with HF. Although an electrolyte in a rechargeable lithium battery generally uses non-aqueous electrolyte, a trace of water may still be included in the electrolyte. The water reacts with lithium salts such as LiPF$_6$ in the electrolyte to produce a strong acid such as HF. HF attacks Mn present in a surface of manganese-based active material and this Mn is dissolved in the electrolyte. As a result, the active material is disintergrated. Due to this problem, the cycle life characteristics, particularly at high temperatures, is remarkably reduced. Whereas, since the positive active material of the present invention includes semi-metal or metal having good reactivity with HF, the semi-metal or metal reacts with HF such that HF is unable to attack Mn. Accordingly, Mn is not eluted into the electrolyte and the active material is not disintergrated. If SiO$_2$ is used for as the semi-metals, SiO$_2$ reacts with HF to generate fluoride compounds such as H$_2$SiF$_6$. If CaO, MgO, SrO or BaO is used for the semi-metal, it reacts with HF to generate CaF$_2$, MgF$_2$, SrF$_2$ or BaF$_2$, respectively. Because the generated fluoride compounds are solid, they do not cause the increases in the internal pressure of the battery. Furthermore, CaF$_2$ exhibiting good conductivity may use for the active material and CaF$_2$ can improve the performance of the battery.

As described above, such problem due to the reaction between the active material and the electrolyte may occur in manganese-based active material as well as in cobalt- and nickel-based active materials. The present invention is applied to not only the manganese-based active material but also to cobalt- and nickel-based active materials. Accordingly, the present invention can provide cobalt- or nickel-based active material with improved thermal stability and exhibits improved discharge capacity and good cycle life at a high C-rate, particularly at high temperatures.

The positive active material composition of the present invention may further include an organic solvent. The exemplary of the organic solvent is N-methylpyrrolidone.

The positive active material composition of the present invention may further include a binder in order to improve adhesion between the positive active material and a current collector. The binder may be any one of the binders known in the related arts. The exemplary of the binder may be polyvinylidene fluoride. The current collector may be aluminum foil, but is not limited to this. Furthermore, the positive active material composition of the present invention further includes a conductive agent. The conductive agent may be any one of the conductive agents known in the related arts. The exemplary of the conductive agent may be carbon black.

A positive electrode preparation using the composition of the present invention will now be described in more detail.

Lithium salt is mixed with a metal compound in a desirable ratio. The lithium salt may be lithium nitrate, lithium acetate, or lithium hydroxide. The metal compound may be a manganese compound for a manganese-based active material, or a cobalt and/or a nickel compound for a cobalt-nickel-based active material. The manganese compound may be manganese acetate or manganese dioxide. The cobalt compound may be cobalt hydroxide, cobalt nitrate or cobalt carbonate. The nickel compound may be nickel hydroxide, nickel nitrate or nickel acetate. The manganese, cobalt, or nickel compounds are not limited to the above compounds. In addition, a fluorine salt such as LiF, a sulfide salt such as NaS, or a phosphorous salt such as H$_3$PO$_4$ may be further used.

At this time, in order to facilitate the reaction of lithium salts and the metal compound, a solvent is added to the mixture. The solvent may be ethanol, methanol, water or acetone. Then, the mixture is mortar grinder mixed until a solvent-free condition is reached.

The resulting mixture is heat-treated at 400 to 600° C. to produce a semi-crystalline positive active material precursor powder. Thereafter, the heat-treated active material precursor powder is dried and the precursor powder is remixed to uniformly mix under conditions of circulating dry air. Alternatively, the remixing step may also be performed after the heat-treating step.

The semi-crystalline precursor powder is again heat-treated at 700 to 900° C. for about 12 hours to produce a crystalline positive active material. The heat-treating step is preferably performed under conditions of circulating dry air or oxygen because a uniform crystalline active material can then be produced.

To the resulting positive active material, a semi-metal, metal or oxide thereof is added. At this time, the amount of the semi-metal, metal or oxide thereof is 0.01 to 10 wt % of the positive active material. The positive active material may be either the resulting positive active material or a positive active material which are available by commercial purchased.

The mixture is mixed with a conductive agent, a binder, and a solvent such as N-methylpyrrolidone to produce a positive active material slurry composition. A positive electrode is produced by a tape-casting method where the positive active material slurry composition is coated on a current collector such as Al foil and the coated current collector is then dried.

With the positive electrode, and a negative electrode and non-aqueous electrolyte, a rechargeable lithium battery is manufactured. Negative electrode preparation is well known in the related art, and the exemplary thereof is that a negative active material slurry including a negative active material and a binder such as polyvinylidene fluoride is coated on a current collector such as Cu foil and the coated current collector is dried. The negative active material may be carbonaceous material generally used a rechargeable lithium battery.

The electrolyte may be a liquid type electrolyte or a gel type electrolyte. The liquid type electrolyte includes an organic solvent and lithium salt dissolved in the organic solvent. The organic solvent may be cyclic carbonate such as ethylene carbonate or methylene carbonate, or linear carbonate such as dimethyl carbonate, diethyl carbonate, ethylmethyl carbonate or methylpropyl carbonate. The lithium salt may be a salt having the ability of facilitating the movement of lithium ions between the positive and the negative electrodes. The exemplary thereof are LiPF$_6$, LiAsF$_6$, LiCF$_3$SO$_3$, LiN(CF$_3$SO$_2$)$_3$, LiBF$_6$ or LiClO$_4$.

The gel type polymer electrolyte is prepared by immersing the liquid type electrolyte into a polymer film and evaporating the solvent from the film. If the gel type polymer electrolyte is used, it is not need to use an additional separator. The separator uses a porous polymer film such as polypropylene, or polyethylene.

Accordingly, a rechargeable lithium battery with the positive active material of the present invention exhibits improved discharge capacity and good cycle life at a high C-rate, particularly at high temperatures.

The following examples further illustrate the present invention.

EXAMPLE 1

LiOH and MnO$_2$ were weighed in the mole ratio of 1/2 of Li/Mn and LiOH and MnO$_2$ were put into a mortar. Ethanol of a sufficient amount to completely react the mixture was added to the mixture and a mortar grinder-mixing step was performed till an ethanol-free condition was obtained.

The resulting mixture was initially heat-treated at 450□ for 5 hours under a dry air atmosphere to produce a semi-crystalline precursor LiMn$_2$O$_4$ powder. The semi-crystalline powder was re-mixed at room temperature to uniformly distribute lithium salts in the mixture. The re-mixed semi-crystalline was again heat-treated at 750□ for 12 hours under a dry air atmosphere to produce crystalline $LiMn_2O_4$ powder. The crystalline $LiMn_2O_4$ powder was identified by SEM and analyzed by XRD.

The crystalline $LiMn_2O_4$ was mixed with Si powder (particle diameters of less than 325 nm, Aldrich, Co.). At this time, the amount of Si powder was 5 wt % of $LiMn_2O_4$. The mixture was mixed with Super P carbon as a conductive agent, KF-1300 polyvinylidene fluoride as a binder and N-methylpyrrolidone as a solvent to produce a positive active material slurry composition. At this time, the ratio of the $LiMn_2O_4$ active material and Si powder mixture: the conductive agent: binder was 94:3:3 wt %. The slurry was cast into a tape shape to form a positive electrode. The positive electrode was then assembled with a lithium metal foil (counter electrode), and a lithium salt solution was added as an electrolyte to thereby fabricate a coin-cell type half-cell. The lithium salt solution included ethylene carbonate and dimethyl carbonate as a solvent and 1M $LiPF_6$ as a solute.

COMPARATIVE EXAMPLE 1

LiOH and $MnO_2$ were weighed in the mole ratio of 1/2 of Li/Mn and LiOH and $MnO_2$ were put into a mortar.

The resulting mixture was initially heat-treated at 450□ for 5 hours under a dry air atmosphere to produce a semi-crystalline precursor $LiMn_2O_4$ powder. The semi-crystalline powder was re-mixed at room temperature to uniformly distribute lithium salts in the mixture. The re-mixed semi-crystalline powder was again heat-treated at 750□ for 12 hours under dry air to produce crystalline $LiMn_2O_4$ powder. The crystalline $LiMn_2O_4$ powder was identified by SEM and analyzed by XRD.

92 wt % of the crystalline $LiMn_2O_4$ was mixed with 4 wt % of Super P carbon as a conductive agent and 4 wt % of KF-1300 polyvinylidene fluoride as a binder in N-methylpyrrolidone as a solvent to produce a positive active material slurry composition. The slurry was cast into a tape shape to produce a positive electrode. The positive electrode was then assembled with a lithium metal foil (counter electrode), and a lithium salt solution is added as an electrolyte to thereby fabricate a coin-cell type half-cell. The lithium salt included ethylene carbonate and dimethyl carbonate as a solvent and 1M $LiPF_6$ as a solute.

The cycle life characteristics at high temperature (50° C.) of cells according to Example 1 and Comparative Example 1 were measured. At this time, the charge and discharge cycles were repeated one time to 0.1 C, three times to 0.2 C, 10 times to 0.5 C and 66 times to 1 C, at 4.3 to 3.0V. The results are presented in FIG. 1. As shown in FIG. 1, the capacity of the cell according to Example 1(a) is reduced by about 15.4% after 66 cycles at a high-rate (1 C charge and discharge). In other words, the capacity maintenance was 84.4%. Whereas, the capacity of the cell according to Comparative Example 1 (b) is reduced by about 73.4% at a high-rate (1 C charge and discharge). In other words, the capacity maintenance was about 26.6%. Accordingly, the active material of the present invention has more stability at high temperature and a high rate (1 C charge and discharge) than does the conventional active material, and also has a limited amount capacity reduction as well as good cycle life characteristics.

EXAMPLE 2

A rechargeable lithium cell was manufactured by the same procedure as in Example 1 except that 10 wt % of Si powder (particle diameters of less than a 325 mesh, Aldrich, Co.) of crystalline $LiMn_2O_4$ was added to produce crystalline $LiMn_2O_4$ powder.

EXAMPLE 3

A rechargeable lithium cell was manufactured by the same procedure as in Example 1 except that 5 wt % of B powder (particle diameters of less than a 325 mesh, Aldrich, Co.) of crystalline $LiMn_2O_4$ was added to produce crystalline $LiMn_2O_4$ powder.

COMPARATIVE EXAMPLE 2

A rechargeable lithium cell was manufactured by the same procedure as in Comparative Example 1 except that ethanol of sufficient amount to completely react the mixture was added to the mixture and a mortar grinder-mixing step was performed till an ethanol-free condition was obtained.

The high-temperature cycle life characteristics of cells according to Examples 2 to 3 and Comparative Example 2 exhibited similar with that of Example 1 and thus, the cells according to Examples 2 and 3 have more stability at high temperature and a high rate (1 C charge and discharge) than do the cells of Comparative Example 2 and also have a limited amount capacity reduction as well as good cycle life characteristics.

EXAMPLE 4

$LiMn_2O_4$ (manufactured by Nikki Co. under LM4) positive active material powder was mixed with Si powder. At this time, the amount of Si was 1 wt % of the positive active material. This mixture, polyvinylidene fluoride as a binder, and Super P carbon as a conductive agent were added to N-methyl pyrrolidone as a solvent to produce a positive active material slurry composition. The ratio of the positive active material powder and Si powder mixture: the binder: the conductive agent was 94:3:3 wt %.

The positive active material slurry composition was coated on Al-foil. The coated foil was dried in an oven at 120° C. for 3 hours and the dried foil was pressed to produce a positive electrode. The positive electrode was then assembled with a lithium metal foil (counter electrode), and a lithium salt solution was added as an electrolyte to thereby fabricate a coin-cell type half cell. The lithium salt solution included ethylene carbonate and dimethyl carbonate (1:1 volume ratio) as a solvent and IM $LiPF_6$ as a solute.

COMPARATIVE EXAMPLE 3

$LiMn_2O_4$ (manufactured by Nikki Co. under LM4) positive active material powder, polyvinylidene fluoride as a binder, and Super P carbon as a conductive agent were added to N-methylpyrrolidone as a solvent to prepare a positive active material slurry composition. At this time, the ratio of the positive active material powder: the binder: the conductive agent was 94:3:3 wt %.

The positive active material slurry composition was coated on Al-foil. The coated Al-foil was dried in an oven at 120° C. for 3 hours and the coated foil was pressed to produce a positive electrode. The positive electrode was then assembled with a lithium metal foil (counter electrode) to thereby fabricate a coin-cell type half-cell.

Figure 2:
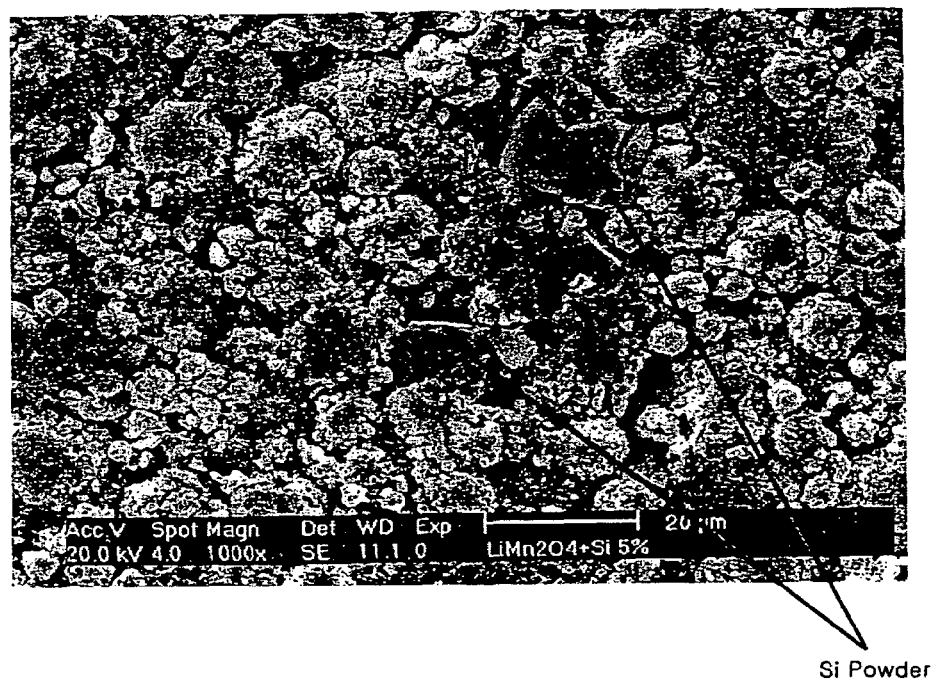
FIG. 2 is a scanning electron microscope (SEM) photograph of a positive electrode for a rechargeable lithium battery according to Example 4 of the present invention.
Figure 3:
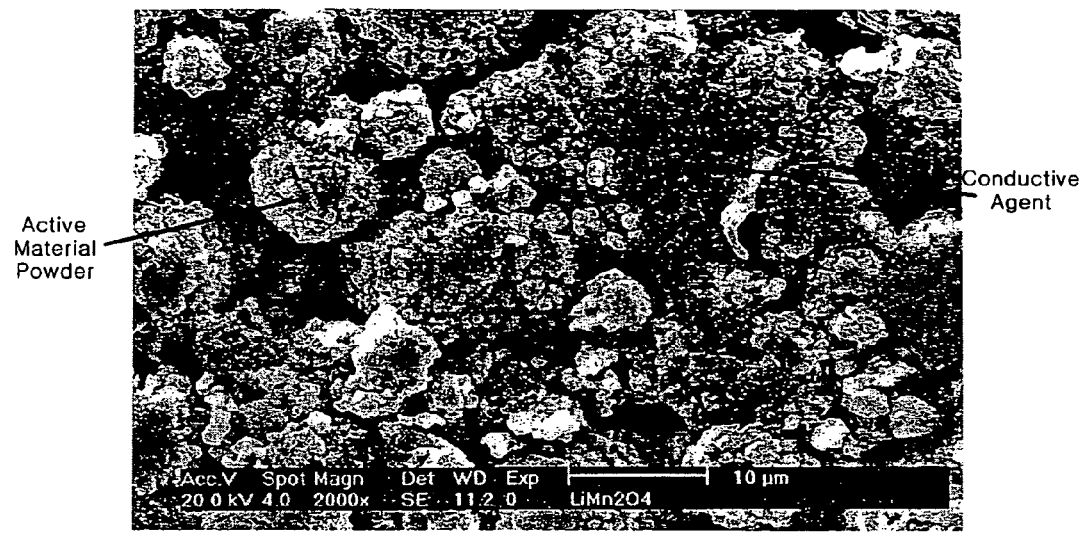
FIG. 3 is a SEM photograph of a positive electrode for a rechargeable lithium battery according to Comparative Example 3.
Figure 4:
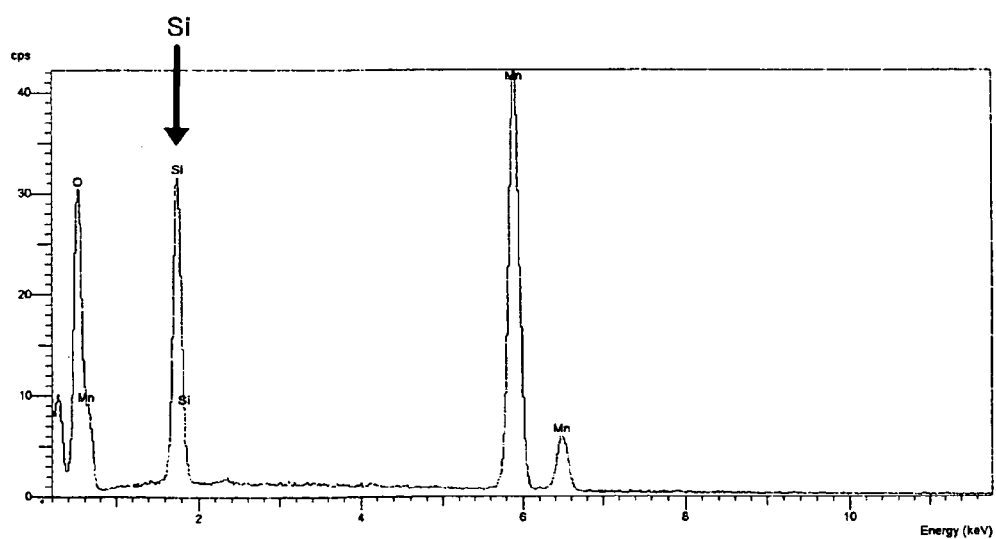
FIG. 4 is a graph illustrating energy dispersive X-ray analysis (EDX) results of a positive electrode according to Example 4 of the present invention.
Figure 5:
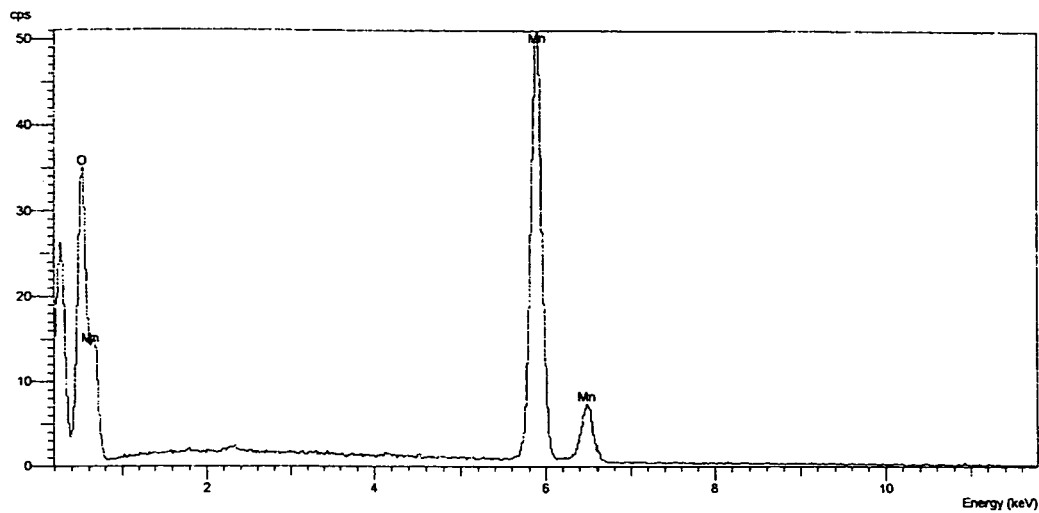
FIG. 5 is a graph illustrating EDX result of a positive electrode according to Comparative Example 3.

SEM photographs of the positive electrodes according to Example 4 and Comparative Example 3 are presented in FIGS. 2 and 3, respectively. As shown in FIG. 2, Si powder was on the surface of the positive electrode according to Example 4. The EDX analysis method is a quantitative analysis and the EDX result is information about the metal component in the positive electrode. In order to identify Si on the positive electrode, the EDX results of the positive electrodes according to Example 4 and Comparative Example 3 are presented in FIGS. 4 and 5. A Si peak occurs in FIG. 4 of Example 4, but no Si peak occurs in FIG. 5 of Comparative Example 5. It is shown that the positive electrode according to Example 4 included Si and that according to Comparative Example 3 did not included Si.

Figure 6:
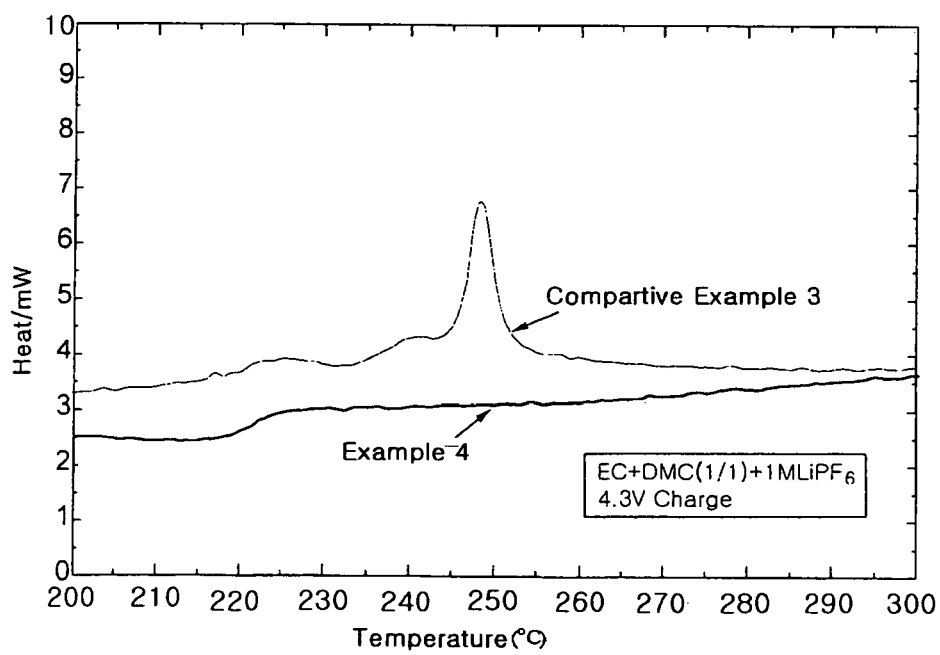
FIG. 6 is a graph illustrating differential scanning calorimetry (DSC) results of positive electrodes according to Example 4 and Comparative Example 3 of the present invention.

After the cells according to Example 4 and Comparative Example 3 were charged at 4.3V, differential scanning calorimetry (DSC) was measured in order to identify the thermal stability of the positive active material. The results are presented in FIG. 6. The positive active material in the electrode of Example 4 was 0.0175 g and that of Comparative Example 3 was 0.0239 g. The charge capacity of Example 4 was 114 mAh/g and the charge capacity of Comparative Example 3 was 103 mAh/g. Though the cell of Example 4 used less positive active material than that of Comparative Example 3, it exhibited a higher charge capacity than that of Comparative Example 3. Furthermore, as shown in FIG. 6, the positive electrode according to Example 4 with Si had no exothermic peaks, whereas that according to Comparative Example 3 without Si had an exothermic peak. When the cell is charged, the manganese active material is converted into unstable $L_{1-x}Mn_2O_4$ of which a bond between metal and oxygen (Mn—O) is easily broken to generate oxygen. The generated oxygen reacts with metal at high temperature to emit heat and the emitted heat causes the exothermic peak occurrence. It is shown that as the exothermic peak area is small, and that the reactivity of the positive active material with the electrolyte is reduced. Accordingly, since the active material according to Example 4 has no exothermic peak, it has excellent stability.

Figure 7:
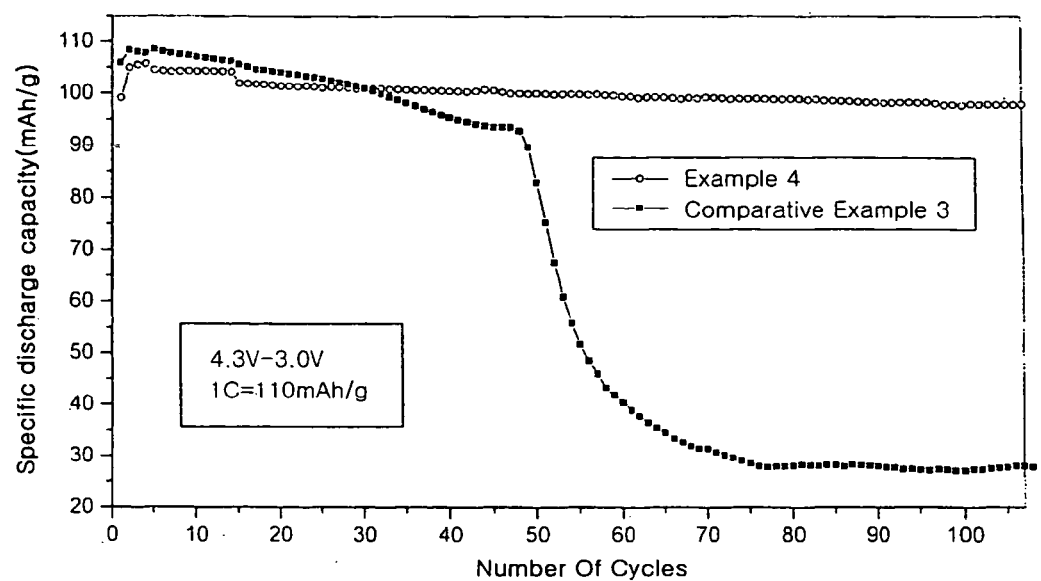
FIG. 7 is a graph illustrating high-temperature cycle life characteristics of rechargeable lithium batteries according to Example 4 and Comparative Example 3 of the present invention.

The high-temperature (50° C.) cycle life characteristics of cells according to Example 4 and Comparative Example 3 were measured. At this time, the charge and discharge cycles were repeated one time to 0.1 C, three times to 0.2 C, 10 times to 0.5 C, and 86 times to 1 C, at 4.3 to 3.0V. The results are presented in FIG. 7. As shown in FIG. 7, the capacity of the cell according to Example 4 is slightly reduced at a high-rate (1 C charge and discharge) and high temperature (50° C.). Whereas, the capacity of the cell according to Comparative Example 3(b) exhibited extremely reduced capacity loss at a high-rate (1 C charge and discharge). Accordingly, the active material of the present invention has more stability at high temperatures and a high rate (1 C charge and discharge) than the conventional active material and has a limited amount capacity reduction as well as good cycle life characteristics.

EXAMPLE 5

A rechargeable lithium cell was manufactured by the same procedure as in Example 4 except that 5 wt % of Si powder of the positive active material was added to the positive active material.

EXAMPLE 6

A rechargeable lithium cell was manufactured by the same procedure as in Example 4 except that 10 wt % of Si powder of the positive active material was added to the positive active material.

Figure 8:
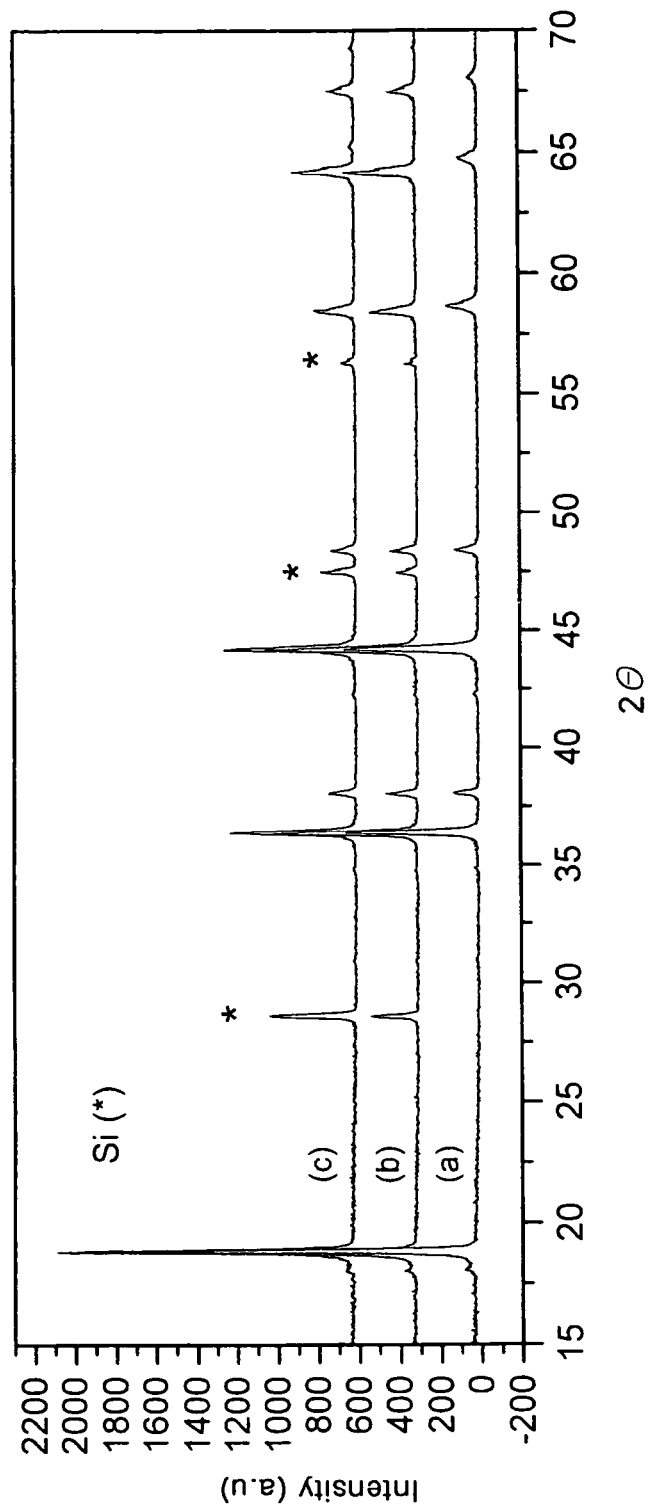
FIG. 8 is a graph illustrating X-ray diffraction (XRD) pattern of positive electrodes according to Examples 5 to 6 and Comparative Example 3 of the present invention.

The XRD patterns of the positive electrode according to Examples 5-6 and Comparative Example 3 are shown in FIG. 8. In FIG. 8, the XRD pattern according to Examples 5-6(b, c) occur a Si peak, but that according to Comparative Example 3(a) occur no Si peak. These results indicate that the surface of the positive electrode according to Examples 5-6 includes Si.

EXAMPLE 7

A rechargeable lithium cell was manufactured by the same procedure as in Example 4 except that 1.3M $LiPF_6$ in a mixed organic solvent of ethylene carbonate, dimethyl carbonate and propylene carbonate (45:40:15 volume ratio) was used for an electrolyte.

COMPARATIVE EXAMPLE 4

A rechargeable lithium cell was manufactured by.the same procedure as in Comparative Example 3 except that 1.3M $LiPF_6$ in a mixed organic solvent of ethylene carbonate, dimethyl carbonate, and propylene carbonate (45:40:15 volume ratio) was used for an electrolyte.

Figure 9:
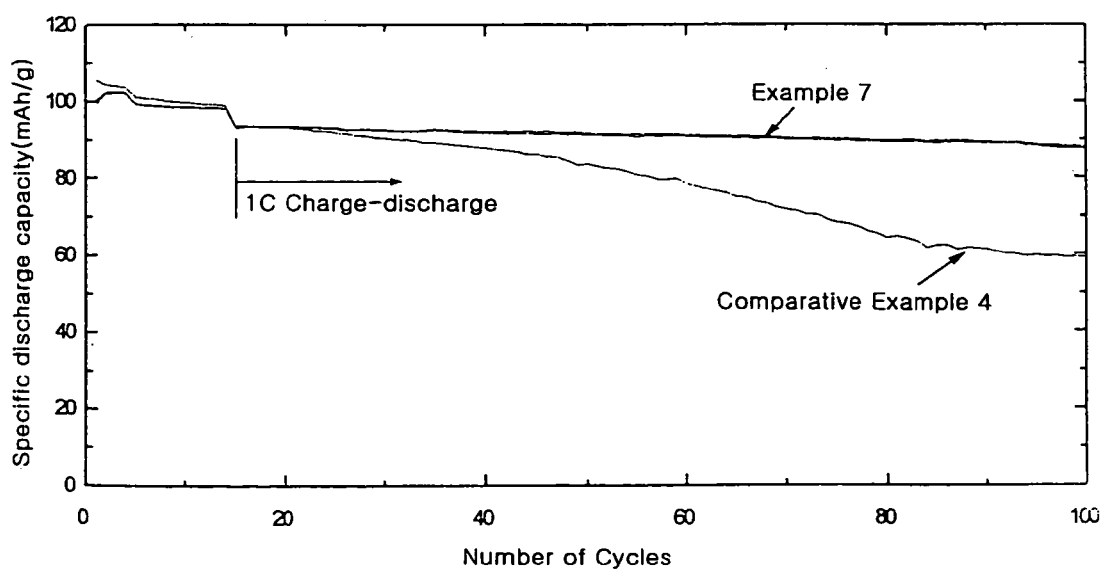
FIG. 9 is a graph illustrating room temperature cycle life characteristics of rechargeable lithium batteries according to Example 7 and Comparative Example 4 of the present invention.

The cycle life characteristics at room temperature of the positive active materials according to Example 7 and Comparative Example 4 were measured. At this time, the charge and discharge cycles were repeated one time to 0.1 C, three times to 0.2 C, 10 times to 0.5 C, and 86 times to 1 C, at 4.3 to 3.0V. The results are presented in FIG. 9. As shown in FIG. 9, the capacity of the cell of Example 7 is slightly reduced at high-rate (1 C charge and 1 C discharge) and room temperature (20☐). Whereas, the capacity of the cell according to Comparative Example 4 is extremely reduced. Accordingly, the positive active material of the present invention has more stability at high temperature and a high rate (1 C charge and discharge) than does the conventional active material and has a limited amount capacity reduction as well as good cycle life characteristics.

EXAMPLE 8

$LiNi_{0.9}Co_{0.1}Sr_{0.002}O_2$ (manufactured by Honjo Co.) positive active material powder was mixed with Si powder. At this time, the amount of Si powder was 1 wt % of the positive active material powder. The mixture, polyvinylidene fluoride as a binder and Super P carbon as a conductive agent were added to N-methyl pyrrolidone as a solvent to prepare a positive active material slurry composition. The mixing ratio of the positive active material and Si powder mixture: the binder: the conductive agent was 94:3:3. The positive active material slurry composition was coated on Al-foil. The coated Al-foil was dried at 120☐ for 3 hours and the dried foil was pressed to make a positive electrode. The positive electrode was then assembled with a lithium metal foil (counter electrode), and a lithium salt solution is added as an electrolyte to thereby fabricate a coin-cell type half-cell. The lithium salt solution included ethylene carbonate and dimethyl carbonate (1:1 volume ratio) as a solvent and 1M $LiPF_6$ as a solute.

EXAMPLE 9

A rechargeable lithium cell was manufactured by the same procedure as in Example 8 except that 5 wt % of Si was added to the positive active material.

COMPARATIVE EXAMPLE 5

$LiNi_{0.9}Co_{0.1}Sr_{0.002}O_2$ (manufactured by Honjo Co.) positive active material powder, polyvinylidene as a binder and Super P carbon as a conductive agent were added to N-methyl pyrrolidone as a solvent to make a slurry. At this time, the ratio of the positive active material powder: the binder: the conductive agent was 94:3:3 wt %.

The positive active material slurry composition was coated on Al-foil. The coated Al-foil was dried in an oven at 120° C.

for 3 hours and the dried foil was pressed to produce a positive electrode. The positive electrode was then assembled with a lithium metal foil (counter electrode).

EXAMPLE 10

LiCoO$_2$ (manufactured by Nippon Chemical Co. under C-10) was mixed with Si powder. At this time, the amount of Si powder was 1 wt % of the positive active material. The mixture, polyvinylidene as a binder and Super P carbon as a conductive agent were added to N-methyl pyrrolidone as a binder to make a positive active material slurry composition. The ratio of the positive active material powder and Si powder mixture: the binder: the conductive agent was 94:3:3.

The positive active material slurry composition was coated on Al-foil. The coated foil was dried in an oven at 120° C. for 3 hours and the dried foil was pressed to produce a positive electrode. The positive electrode was then assembled with a lithium metal foil (counter electrode), and a lithium salt solution was added as an electrolyte to thereby fabricate a coin-cell type half-cell. The lithium salt solution included ethylene carbonate and dimethyl carbonate (1:1 volume ratio) as a solvent and 1M LiPF$_6$ as a solute.

EXAMPLE 11

A rechargeable lithium cell was manufactured by the same procedure as in Example 10 except that 5 wt % of Si was added to the positive active material.

COMPARATIVE EXAMPLE 6

LiCoO$_2$ (manufactured by Nippon Chemical Co.) positive active material powder, polyvinylidene fluoride as a binder and Super P carbon as a conductive agent were added to N-methyl pyrrolidone as a solvent to make a positive active material slurry composition. At this time, the ratio of the positive active material powder: the binder: the conductive agent was 94:3:3 wt %.

The positive active material slurry composition was coated on Al-foil. The coated foil was dried in an oven at 120° C. for 3 hours and the dried foil was pressed to produce a positive electrode. The positive electrode was then assembled with a lithium metal foil (counter electrode).

Figure 10:
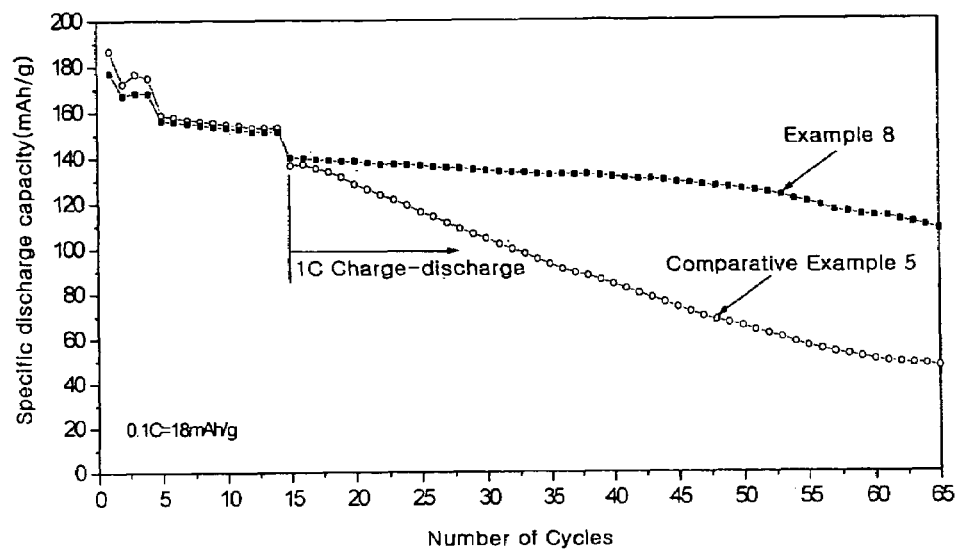
FIG. 10 is a graph illustrating cycle life characteristics of rechargeable lithium batteries according to Example 8 and Comparative Example 5 of the present invention.

The cycle life characteristics of the cells according to Example 8 and Comparative Example 5 were measured. At this time, the charge and discharge cycles were repeated one time to 0.1 C, three times to 0.2 C, 10 times to 0.5 C and 51 times to 1 C, at 4.3 to 3.0V. The results are shown in FIG. 10. As shown in FIG. 10, the capacity of the cell using the active material of Example 8 was slightly reduced from about 140 mAh/g to about 115 mAh/g after 51 cycles at high-rate (1 C charge and discharge). Whereas, the capacity of the cell using the active material of Comparative Example 5 was extremely reduced from about 140 mAh/g to about 50 mAh/g after 51 cycles at a high-rate (1 C charge and discharge). Accordingly, the active material of the present invention has more stability at a high temperature and a high rate (1 C charge and discharge) than the conventional active material and has a limited amount capacity reduction as well as good cycle life characteristics.

Figure 11:
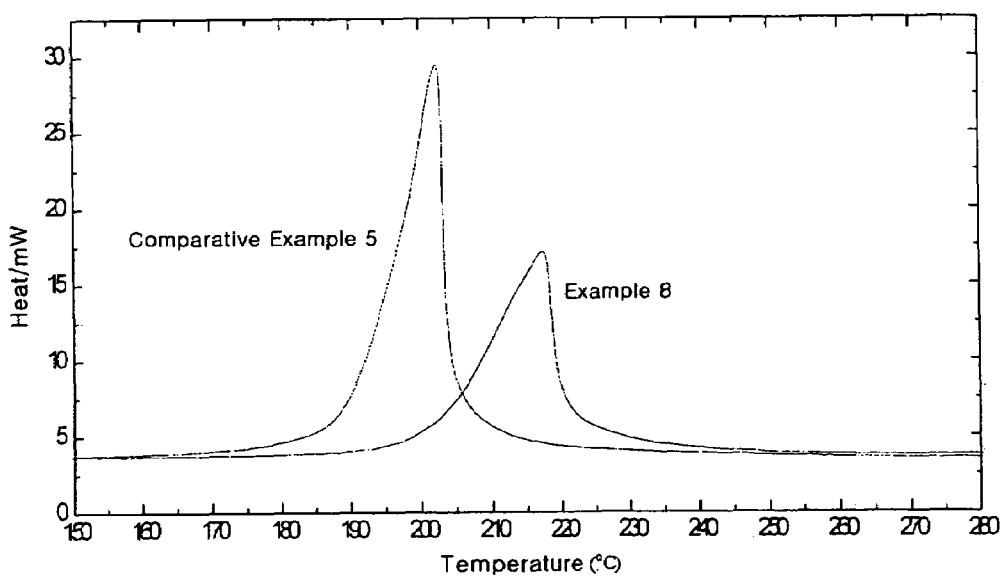
FIG. 11 is a graph illustrating DSC results of positive electrodes according to Example 8 and Comparative Example 5 of the present invention.

Differential scanning calorimetry (DSC) of the cells according to Example 8 and Comparative Example 5 after charging 4.3V were measured and the results are presented in FIG. 11. As shown in FIG. 11, the exothermic peak area of the cell according to Example 8 with Si is smaller than that of Comparative Example 5 without Si. The exothermic peak appeares due to the heat generated when the active material reacts with the electrolyte. As the exothermic peak area is small, the reactivity of the active material with the electrolyte is reduced, and thus it is stable. The oxygen decomposition temperature (218° C.) of the cell according to Example 8 is higher than that of Comparative Example 5 (202° C.).

Accordingly, the cell of Example 8 has superior thermal stability. This is because after charging a lithium cell, a structure of the positive active material is converted from LiCoO$_2$ to Li$_{1-x}$CoO$_2$. As the Li$_{1-x}$CoO$_2$ active material is unstable, oxygen boned with metal (Co—O) decomposes according to increases in temperature. The decomposed oxygen may react with electrolyte in a cell and cause the cell to explode.

The high-temperature cycle life characteristics and DSC results of the cells according to Examples 9-11 exhibited similar with Example 8 and thus, the cells are stable at a high-rate charge and discharge and have good thermal stability.

EXAMPLE 12

A rechargeable lithium cell was manufactured by the same procedure as in Example 8 except that LiMi$_{0.88}$Co$_{0.12}$La$_{0.01}$O$_2$ positive active material powder was used.

COMPARATIVE EXAMPLE 7

A rechargeable lithium cell was manufactured by the same procedure as in Comparative Example 1 except that LiNi$_{0.88}$Co$_{0.12}$La$_{0.01}$O$_2$ positive active material powder was used.

Figure 12:
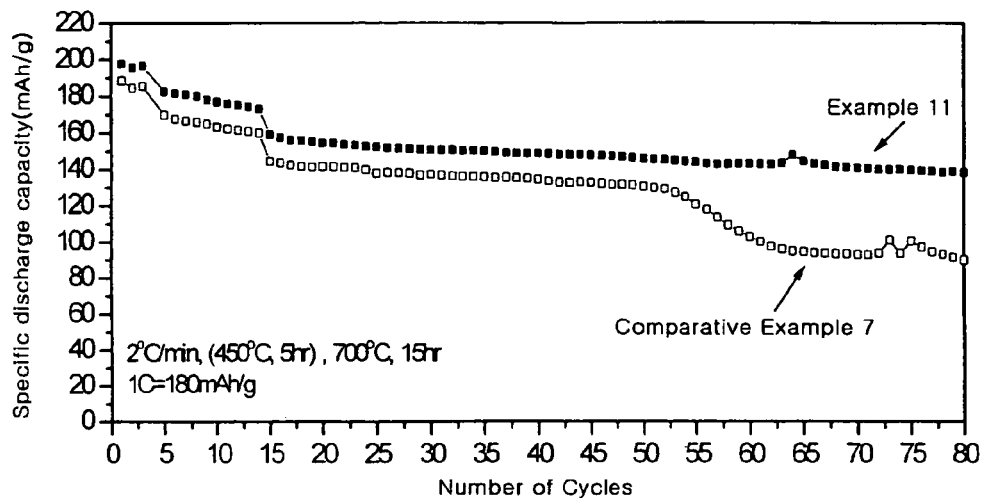
FIG. 12 is a graph illustrating room-temperature cycle life characteristics of rechargeable manganese-based lithium half-cells according to Example 12 and Comparative Example 7 of the present invention.

The cycle life characteristics of the cells according to Example 12 and Comparative Example 7 were measured at room temperature (20° C.). At this time, the charge and discharge cycles were repeated three times to 0.2 C, 10 times to 0.5 C, 66 times to 1 C, at 4.3 to 3.0V. The results are shown in FIG. 12. As shown in FIG. 12, the capacity of the cell using the active material of Example 12 was slightly reduced at a high-rate (1 C charge and discharge) and room temperature (20□). Whereas, the capacity of the cell using the active material of Comparative Example 7 was extremely reduced at a high-rate (1 C charge and discharge) and room temperature.

EXAMPLE 13

LiMn$_2$O$_4$ (manufactured by Nikki Co. under LM4) positive active material powder was mixed with Si powder. At this time, the amount of SiO$_2$ powder was 1 wt % of the positive active material powder. The mixture, polyvinylidene fluoride as a binder and Super P carbon as a conductive agent were added to N-methyl pyrrolidone as a solvent to make a positive active material slurry composition. The ratio of the positive active material and SiO$_2$ powder mixture: the binder: the conductive agent was 94:3:3 wt %.

The positive active material slurry composition was coated on Al-foil. The coated foil was dried in an oven 120° C. for 3 hours and the dried foil was pressed to produce a positive electrode. The positive electrode was then assembled with a lithium metal foil (counter electrode), and a lithium salt solution was added as an electrolyte to thereby fabricate a coin-cell type half-cell. The lithium salt solution included ethylene carbonate and dimethyl carbonate (1:1 volume ratio) as a solvent and 1M $LiPF_6$ as a solute.

EXAMPLE 14

A rechargeable lithium cell was manufactured by the same procedure as in Example 13 except that 5 wt % of $SiO_2$ powder was added to the positive active material.

COMPARATIVE EXAMPLE 8

$LiMn_2O_4$ (manufactured by Nikki Co. under LM4) positive active material powder, a polyvinylidene fluoride binder and a Super P conductive agent were added to a N-methyl pyrrolidone solvent to make a positive active material slurry composition. At this time, the ratio of the positive active material powder: the binder: the conductive agent was 94:3:3 wt %.

The positive active material slurry composition was coated on Al-foil. The coated foil was dried in an oven 120° C. for 3 hours and the dried foil was pressed to produce a positive electrode. The positive electrode was then assembled with a lithium metal foil (counter electrode).

Figure 13:
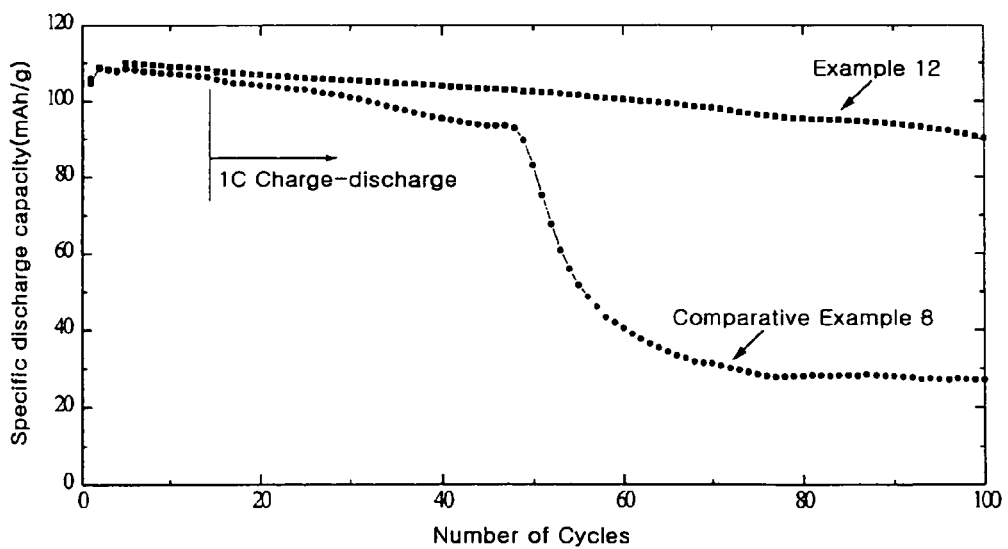
FIG. 13 is a graph showing high-temperature cycle life characteristics of rechargeable cobalt-based lithium full cells according to Example 13 and Comparative Example 8 of the present invention.

The cycle life characteristics at high temperature (50° C.) of the active materials according to Example 13 and Comparative Example 8 were measured. At this time, the charge and discharge cycles were repeated one time to 0.1 C, three times to 0.2 C, 10 times to 0.5 C and 86 times to 1 C, at 4.3 to 3.0V. The results are presented in FIG. 13. As shown in FIG. 13, the capacity of the cell according to Example 13 was slightly reduced after 86 cycles at a high-rate (1 C charge and 1 C discharge) and high temperature. Whereas, the capacity of the cell according to Comparative Example 8 was significantly reduced after 86 cycles at a high-rate (1 C charge and 1 C discharge) and high temperature. Accordingly, the active material of the present invention has more stability at high temperature and a high rate (1 C charge and discharge) than the conventional active material and has a limited amount capacity reduction as well as good cycle life characteristics. The high-temperature cycle life characteristics of cell according to Example 14 exhibited similar with that of Example 13 and thus, the cell according to Example 14 has more stability at high temperature and a high rate and also have a limited amount capacity reduction as well as good cycle life characteristics.

EXAMPLE 15

A rechargeable lithium cell was manufactured by the same procedure as in Example 13 except that $LiNi_{0.9}Co_{0.1}Sr_{0.002}O_2$ (manufactured by Honjo Co.) was used as a positive active material.

EXAMPLE 16

A rechargeable lithium cell was manufactured by the same procedure as in Example 14 except that $LiNi_{0.9}Co_{0.1}Sr_{0.002}O_2$ (manufactured by Honjo Co.) was used as a positive active material.

COMPARATIVE EXAMPLE 9

A rechargeable lithium cell was manufactured by the same procedure as in Comparative example 8 except that $LiNi_{0.9}Co_{0.1}Sr_{0.002}O_2$ (manufactured by Honjo Co.) was used as a positive active material.

The cycle life characteristics of the cells according to Examples 15-16 and Comparative example 9 were measured and exhibited similar results with FIG. 13. Accordingly, the positive active material according to Examples 15-16 has good high-temperature cycle life characteristics.

EXAMPLE 17

A rechargeable lithium cell was manufactured by the same procedure as in Example 13 except that $LiCoO_2$ (manufactured by Nippon Chemical Co. under C-10) was used.

EXAMPLE 18

A rechargeable lithium cell was manufactured by the same procedure as in Example 14 except that $LiCoO_2$ (manufactured by Nippon Chemical Co. under C-10) was used.

COMPARATIVE EXAMPLE 10

A rechargeable lithium cell was manufactured by the same procedure as in Comparative Example 8 except that $LiCoO_2$ (manufactured by Nippon Chemical Co. under C-10) was used.

The cycle life characteristics of the cells according to Examples 17-18 and Comparative example 10 were measured and exhibited similar results with FIG. 13. Accordingly, the positive active material according to Examples 17-18 has good high-temperature cycle life characteristics.

EXAMPLE 19

A rechargeable lithium full cell was manufactured by a conventional process and with a positive active material according to Example 13 and a mesophase carbon fiber (MCF) negative active material.

COMPARATIVE EXAMPLE 11

A rechargeable lithium full cell was manufactured by the same procedure as in Example 19 except that the positive active material according to Comparative Example 8 was used.

Figure 14:
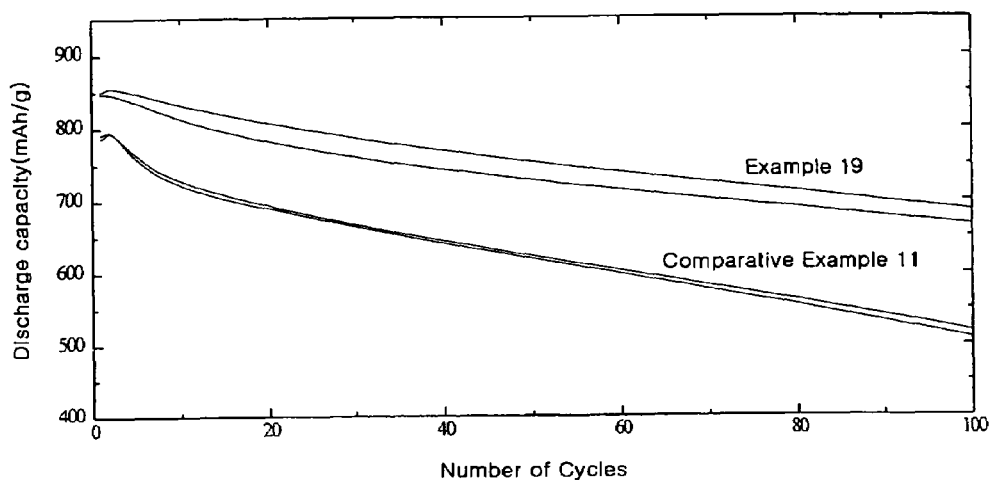
FIG. 14 is a graph showing high-temperature cycle life characteristics of rechargeable manganese-based lithium full cells according to Example 19 and Comparative Example 11 of the present invention.

The cycle life characteristics at high temperature (60° C.) of the cells according to Example 19 and Comparative Example 11 were measured and the results are shown in FIG. 14. The cycle life characteristics results were obtained from a total of four cells (two Example 19 cells and two Comparative Example 11 cells). As shown in FIG. 14, a rechargeable lithium full cell according to Example 19 with $SiO_2$ has better high-temperature cycle life characteristics than a cell without $SiO_2$.

EXAMPLE 20

$LiCoO_2$ (manufactured by Nippon Chemical Co. under C-10) positive active powder was mixed with CaO (particle diameters of less than a 325 mesh). At this time, the amount of CaO was 0.1 wt % of the positive active powder. The mixture, polyvinylidene fluoride as a binder and Super P carbon as a conductive agent were added to N-methyl pyrrolidone as a solvent to make a positive active material slurry composition. The ratio of the $LiCoO_2$ and CaO mixture: the binder: the conductive agent was 94:3:3 wt %.

The positive active material slurry composition was coated on an Al-foil. The coated foil was dried in an oven at 120° C. for 3 hours and the dried foil was then pressed to produce a positive electrode. The positive electrode was then assembled with a lithium metal foil (counter electrode) and a lithium salt solution was added as an electrolyte to thereby fabricate a coin-cell type half-cell. The lithium salt solution included ethylene carbonate and dimethyl carbonate (1:1 volume ratio) as a solvent and 1M $LiPF_6$ as a solute.

EXAMPLE 21

A rechargeable lithium half-cell was manufactured by the same procedure in Example 20 except that 0.5 wt % of CaO of the positive active material powder was added to the positive active material.

EXAMPLE 22

A rechargeable lithium half-cell was manufactured by the same procedure in Example 20 except that 1.0 wt % of CaO of the positive active material powder was added to the positive active material.

EXAMPLE 23

A rechargeable lithium half-cell was manufactured by the same procedure in Example 20 except that $LiMn_2O_4$ powder (manufactured by Nikki, Co., under LM4) was used as a positive active material and 0.5 wt % of CaO of the positive active material was added to the positive active material.

EXAMPLE 24

A rechargeable lithium half-cell was manufactured by the same procedure in Example 20 except that $LiNi_{0.9}Co_{0.1}Sr_{0.002}O_2$ powder (Honjo, CO.) was used as a positive active material.

EXAMPLE 25

A rechargeable lithium half-cell was manufactured by the same procedure in Example 20 except that $LiNi_{0.9}Co_{0.1}Sr_{0.002}O_2$ powder (Honjo, Co.) was used as a positive active material and 0.5 wt % of CaO of the positive active material was added to the positive active material.

COMPARATIVE EXAMPLE 12

A rechargeable lithium half-cell was manufactured by the same procedure in Example 20 except that CaO was not used.

COMPARATIVE EXAMPLE 13

A rechargeable lithium half-cell was manufactured by the same procedure in Example 22 except that CaO was not used.

COMPARATIVE EXAMPLE 14

A rechargeable lithium half-cell was manufactured by the same procedure in Example 24 except that CaO was not used.

Figure 15:
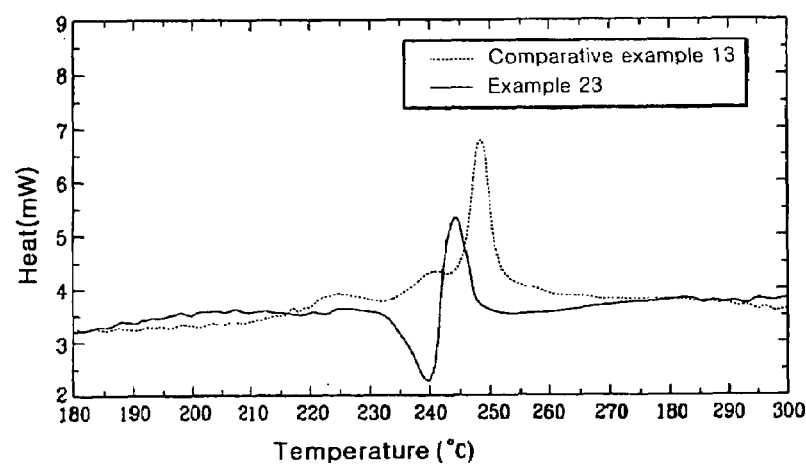
FIG. 15 is a graph illustrating DSC results of positive electrodes according to Example 23 and Comparative Example 13 of the present invention.

After the cells according to Example 23 and Comparative Example 13 were charged at 4.3V, differential scanning calorimetry (DSC) was measured in order to identify the thermal stability of the positive active material. The results are presented in FIG. 15. It is shown from FIG. 15 that endothermic peak and exothermic reactions occur in the electrode according to Example 23. The endothermic peak occurs by the reaction of CaO and the electrolyte in the electrode and the exothermic peak occurs by the reaction of the remaining electrolyte and $LiMn_2O_4$. Whereas, the exothermic peak only occurs by the reaction of $O_2$ which generates from the charged electrode and the electrolyte.

Figure 16:
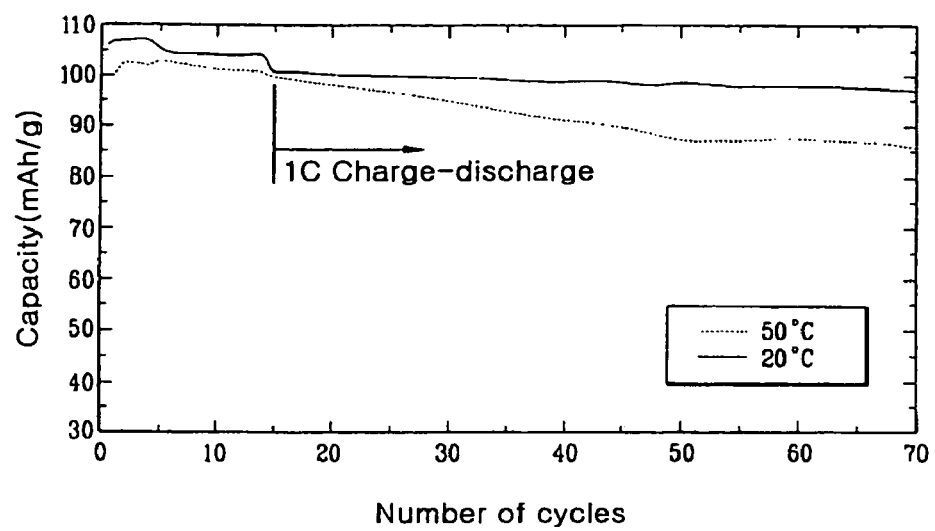
FIG. 16 is a graph showing cycle life characteristics of rechargeable lithium half-cell at room temperature and high temperature according to Example 23.

The cycle life characteristics of the cell according to Example 23 were measured. At this time, the charge and discharge cycles were repeated 100 times to 0.1 C, 0.2 C, 0.5 C and 1 C, between 4.3 and 3.0V at room temperature (20° C.) and high temperature (50° C.), respectively. The results are presented in FIG. 16. As shown in FIG. 16, the cell according to Example 23 exhibited good cycle life characteristics at room temperature (20° C.) and high temperature (50° C.).

Figure 17:
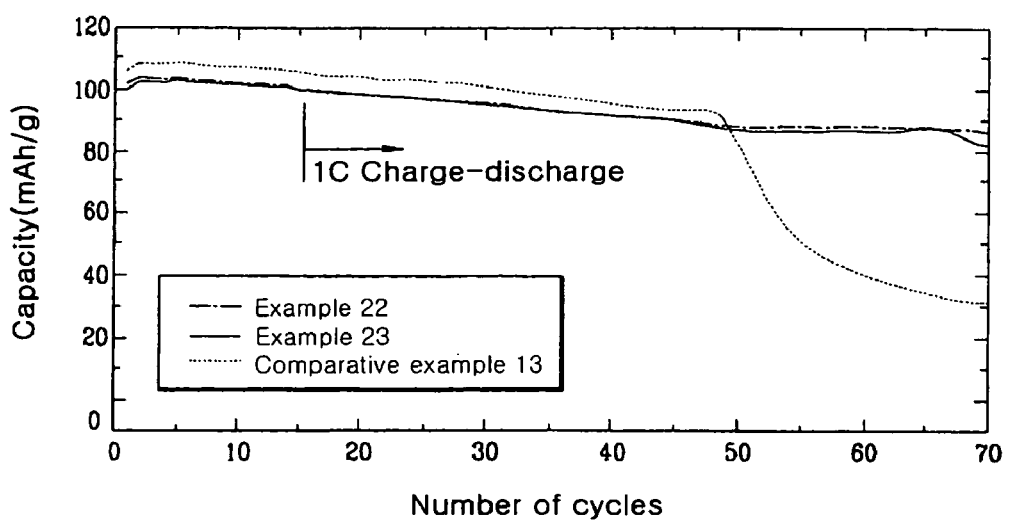
FIG. 17 is a graph showing high-temperature cycle life characteristics of rechargeable lithium coin-type half cell according to Examples 22 and 23, and Comparative Example 13.

The high-temperature cycle life characteristics of the cells according to Examples 22 and 23, and Comparative example 13 were measured. At this time, the charge and discharge cycles were repeated 100 times to 0.1 C, 0.2 C, 0.5 C and 1 C, between 4.3 and 3.0V at 50 C. The results are shown in FIG. 17. As shown in FIG. 17, the cells according to Examples 22 and 23 exhibited good cycle life characteristics than that according to Comparative example 13.

As described above, the rechargeable lithium battery using the positive active material composition of the present invention exhibits good electrochemical properties and thermal stability. The manganese-based rechargeable lithium battery of the present invention exhibits improved high temperature cycle life characteristics and the nickel- and cobalt-based rechargeable lithium battery exhibits good stability.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. A rechargeable lithium battery comprising:
   a positive electrode including a positive active material comprising a lithiated transition metal compound, and an additive, said additive at least one of Si, B, Ge, Ga, Ca, Sr, and Ba or oxides thereof;
   a negative electrode including a carbonaceous material as an active material; and
   an electrolyte including an organic solvent and a lithium salt dissolved in the organic solvent, wherein the additive is 0.01 to 10 wt % of the positive active material,
   wherein the lithiated transition metal compound is selected from the group consisting of compounds represented by formulas 1 to 13:

$$Li_xMnA_2 \qquad (1)$$

$$Li_xMnO_{2-z}A_z \qquad (2)$$

$$Li_xMn_{1-y}M'_yA_2 \qquad (3)$$

$$Li_xMn_2A_4 \qquad (4)$$

$$Li_xMn_2O_{4-z}A_z \qquad (5)$$

$$Li_xMn_{2-y}M'_yA_4 \qquad (6)$$

$$Li_xBA_2 \qquad (7)$$

$$Li_xBO_{2-z}A_z \qquad (8)$$

$$Li_xB_{1-y}M'_yA_2 \qquad (9)$$

$$Li_xB_{1-y}M''_yO_{2-z}A_z \qquad (10)$$

$$Li_xNiCoA_2 \qquad (11)$$

$Li_xNiCoO_{2-z}A_2$ (12)

$Li_xNi_{1-y-z}Co_yM''_zA_2$ (13)

wherein $1.0 \leq x \leq 1.1$, $0.01 \leq y \leq 0.1$, $0.01 \leq z \leq 0.5$, M' is at least one transition metal or lanthanide metal selected from the group consisting of Al, Cr, Co, Mg, La, Ce, Sr and V, M'' is at least one transition metal or lanthanide metal selected from the group consisting of Al, Cr, Mn, Fe, Mg, La, Ce, Sr and V, A is selected from O, F, S or P, and B is Ni or Co.

2. The rechargeable lithium battery of claim 1, wherein said organic solvent is N-methylpyrrolidone.

3. The rechargeable lithium battery of claim 1 wherein the lithiated transition metal compound is a compound represented by formula:

$Li_xBA_2$ where $1.0 \leq x \leq 1.1$, A is selected from O, F, S or P, and B is Ni or Co.

4. The rechargeable lithium battery of claim 1 wherein the lithiated transition metal compound is a compound represented by formula:

$Li_xBO_{2-z}A_z$ where $1.0 \leq x \leq 1.1$, $0.01 \leq z \leq 0.5$, A is selected from O, F, S or P, and B is Ni or Co.

5. The rechargeable lithium battery of claim 1 wherein the lithiated transition metal compound is a compound represented by formula:

$Li_xB_{1-y}M''_yA_z$ where $1.0 \leq x \leq 1.1$, $0.01 \leq y \leq 0.1$, M'' is at least one transition metal or lanthanide metal selected from the group consisting of Al, Cr, Mn, Fe, Mg, La, Ce, Sr and V, and A is selected from O, F, S or P, and B is Ni or Co.

6. The rechargeable lithium battery of claim 1 wherein the lithiated transition metal compound is a compound represented by formula:

$Li_xB_{1-y}M''_yO_{2-z}A_z$ where $1.0 \leq x \leq 1.1$, $0.01 \leq y \leq 0.1$, $0.01 \leq z \leq 0.5$, M'' is at least one transition metal or lanthanide metal selected from the group consisting of Al, Cr, Mn, Fe, Mg, La, Ce, Sr and V, and A is selected from O, F, S or P, and B is Ni or Co.

7. The rechargeable lithium battery of claim 1 wherein the lithiated transition metal compound is a compound represented by formula:

$Li_xNiCoA_2$ where $1.0 \leq x \leq 1.1$, and A is selected from O, F, S or P.

8. The rechargeable lithium battery of claim 1 wherein the lithiated transition metal compound is a compound represented by formula:

$Li_xNiCoO_{2-z}A_z$ where $1.0 \leq x \leq 1.1$, $0.01 \leq z \leq 0.5$, and A is selected from O, F, S or P.

9. The rechargeable lithium battery of claim 1 wherein the lithiated transition metal compound is a compound represented by formula:

$Li_xNi_{1-y-z}Co_yM''_zA_2$ where $1.0 \leq x \leq 1.1$, $0.01 \leq y \leq 0.1$, $0.01 \leq z \leq 0.5$, M'' is at least one transition metal or lanthanide metal selected from the group consisting of Al, Cr, Mn, Fe, Mg, La, Ce, Sr and V, and A is selected from O, F, S or P.

10. The rechargeable lithium battery of claim 1, wherein the positive active material composition is prepared by physically mixing the positive active material and a binder in the organic solvent in a form of slurry.

11. The rechargeable lithium battery of claim 1, wherein the positive active material comprises particles of the additive.

12. A positive electrode to be used in a battery, the positive electrode comprising:

a positive active material, the positive active material including at least one lithiated compound; and particles of an additive mixed in the positive active material, the particles of the additive including at least one of Si, B, Ge, Ga, Ca, Sr, and Ba and oxides thereof, wherein the positive electrode has from 1.0 to 10 wt % of the particles of the additive, wherein the lithiated compound is selected from the group consisting of compounds represented by formulas 1 to 13:

$Li_xMnA_2$ (1)

$Li_xMnO_{2-z}A_z$ (2)

$Li_xMn_{1-y}M'_yA_2$ (3)

$Li_xMn_2A_4$ (4)

$Li_xMn_2O_{4-z}A_z$ (5)

$Li_xMn_{2-y}M'_yA_4$ (6)

$Li_xBA_2$ (7)

$Li_xBO_{2-z}A_z$ (8)

$Li_xB_{1-y}M''_yA_2$ (9)

$Li_xB_{1-y}M''_yO_{2-z}A_z$ (10)

$Li_xNiCoO_{2-z}A_z$ (11)

$Li_xNiCoO_{2-z}A_z$ (12)

$Li_xNi_{1-y-z}Co_yM''_zA_2$ (13)

wherein $1.0 \leq x \leq 1.1$, $0.01 \leq y \leq 0.1$, $0.01 \leq z \leq 0.5$, M' is at least one transition metal or lanthanide metal selected from the group consisting of Al, Cr, Co, Mg, La, Ce, Sr, or V, M'' is at least one transition metal or lanthanide metal selected from Al, Cr, Mn, Fe, Mg, La, Ce, Sr and V, A is selected from O, F, S or P, and B is Ni or Co.

13. The positive electrode of claim 12, wherein the particles of the additive comprise at least one of Si, Ga, Ge, and oxides thereof.

14. The positive electrode of claim 13, wherein the particles of the additive comprise $SiO_2$.

* * * * *

UNITED STATES PATENT AND TRADEMARK OFFICE
CERTIFICATE OF CORRECTION

PATENT NO. : 7,655,358 B2
APPLICATION NO. : 11/510301
DATED : February 2, 2010
INVENTOR(S) : Ho-Jin Kweon et al.

Page 1 of 1

It is certified that error appears in the above-identified patent and that said Letters Patent is hereby corrected as shown below:

In the Claims, Column 18, Claim 12, line 42, delete "$Li_xNiCoO_{2-z}A_z$" insert --$Li_xNiCoA_2$--.

Column 18, Claim 12, line 44, delete "$Li_xNiCoO_{2-z}A_z$" insert --$Li_xNiCoO_{2-z}A_2$--.

Signed and Sealed this
Twenty-sixth Day of July, 2011

David J. Kappos
*Director of the United States Patent and Trademark Office*